US006736337B2

(12) United States Patent
Vildibill et al.

(10) Patent No.: US 6,736,337 B2
(45) Date of Patent: May 18, 2004

(54) PRESSURE COMPENSATING DRIP IRRIGATION HOSE

(75) Inventors: Jeffrey A. Vildibill, Poway, CA (US); William C. Taylor, Jr., El Cajon, CA (US)

(73) Assignee: The Toro Company, Bloomington, MN (US)

( * ) Notice: Subject to any disclaimer, the term of this patent is extended or adjusted under 35 U.S.C. 154(b) by 148 days.

(21) Appl. No.: 10/072,315

(22) Filed: Feb. 8, 2002

(65) Prior Publication Data
US 2003/0150940 A1 Aug. 14, 2003

(51) Int. Cl.[7] ............................................. B05B 15/00
(52) U.S. Cl. ............... 239/542; 239/533.1; 239/533.13; 239/547
(58) Field of Search ............................. 239/533.1, 542, 239/547, 533.13, 568

(56) References Cited

U.S. PATENT DOCUMENTS

| 3,870,236 A | 3/1975 | Sahagun-Barragan |
| 4,210,287 A | 7/1980 | Mehoudar |
| 4,247,051 A | 1/1981 | Allport |
| 4,593,857 A | 6/1986 | Raz |
| 4,728,042 A | 3/1988 | Gorney et al. |
| 4,817,875 A | 4/1989 | Karmeli et al. |
| 4,880,167 A | 11/1989 | Langa et al. |
| 4,958,772 A | 9/1990 | Fabbri et al. |
| 4,984,739 A | 1/1991 | Allport |
| 5,111,995 A | 5/1992 | Dumitrascu et al. |
| 5,118,042 A | 6/1992 | Delmer |
| 5,163,622 A | 11/1992 | Cohen |
| 5,183,208 A | 2/1993 | Cohen |
| 5,203,503 A | 4/1993 | Cohen |
| 5,207,386 A | 5/1993 | Mehoudar |
| 5,294,058 A | 3/1994 | Einav |
| 5,330,107 A | 7/1994 | Karathanos |
| 5,333,793 A | 8/1994 | DeFrank |
| 5,400,973 A | 3/1995 | Cohen |
| 5,586,727 A | 12/1996 | Shekalim |
| 5,609,303 A | 3/1997 | Cohen |
| 5,615,838 A | 4/1997 | Eckstein et al. |
| 5,620,143 A | 4/1997 | Delmer et al. |
| 5,628,462 A | 5/1997 | Miller |
| 5,634,594 A | 6/1997 | Cohen |
| 5,636,797 A | 6/1997 | Cohen |
| 5,673,852 A | 10/1997 | Roberts |
| 5,676,897 A | 10/1997 | Dermitzakis |
| 5,688,072 A | 11/1997 | Meyer et al. |
| 5,722,601 A | 3/1998 | DeFrank et al. |
| 5,732,887 A | 3/1998 | Roberts |
| 5,813,603 A | 9/1998 | Kurtz |
| 5,820,029 A | 10/1998 | Marans |
| 5,829,685 A | 11/1998 | Cohen |
| 5,829,686 A | 11/1998 | Cohen |
| 5,855,324 A | 1/1999 | DeFrank et al. |
| 5,957,391 A * | 9/1999 | DeFrank et al. ............ 239/542 |
| 6,027,048 A | 2/2000 | Mehoudar |
| 6,039,270 A | 3/2000 | Dermitzakis |
| 6,116,523 A | 9/2000 | Cabahug et al. |
| 6,120,634 A | 9/2000 | Harrold et al. |
| 6,179,949 B1 | 1/2001 | Buluschek |

(List continued on next page.)

Primary Examiner—Steven J. Ganey
(74) Attorney, Agent, or Firm—IPLM Group, P.A.

(57) ABSTRACT

A pressure compensated drip irrigation hose (20) includes a hose having a wall (21) with an inner surface (21a). A continuous elastomeric strip member (30) is connected to the inner surface (21a). The continuous elastomeric strip member (30) and inner surface (21a) form a plurality of emitters. The emitters have an inlet section (40), a pressure reducing section (60) which is downstream from the inlet section (40). A pressure responsive section (70) is downstream from the pressure reducing section (60) and the outlet section (80) is downstream from the pressure responsive section (70). The continuous elastomeric strip member (30) is constructed from a material softer than the wall (21).

27 Claims, 5 Drawing Sheets

U.S. PATENT DOCUMENTS

| | | |
|---|---|---|
| 6,206,305 B1 | 3/2001 | Mehoudar |
| 6,213,408 B1 * | 4/2001 | Shekalim ................ 239/533.1 |
| 6,250,571 B1 | 6/2001 | Cohen |
| 6,302,338 B1 | 10/2001 | Cohen |
| 6,308,902 B1 | 10/2001 | Huntley |
| 6,371,390 B1 | 4/2002 | Cohen |
| 6,382,530 B1 | 5/2002 | Perkins |
| 6,403,013 B1 | 6/2002 | Man |
| 6,461,468 B1 | 10/2002 | Cohen |
| 6,464,152 B1 | 10/2002 | Bolinis et al. |
| 6,561,443 B2 | 5/2003 | Delmer |
| 2002/0074434 A1 | 6/2002 | Delmer |
| 2002/0113147 A1 | 8/2002 | Huntley |

* cited by examiner

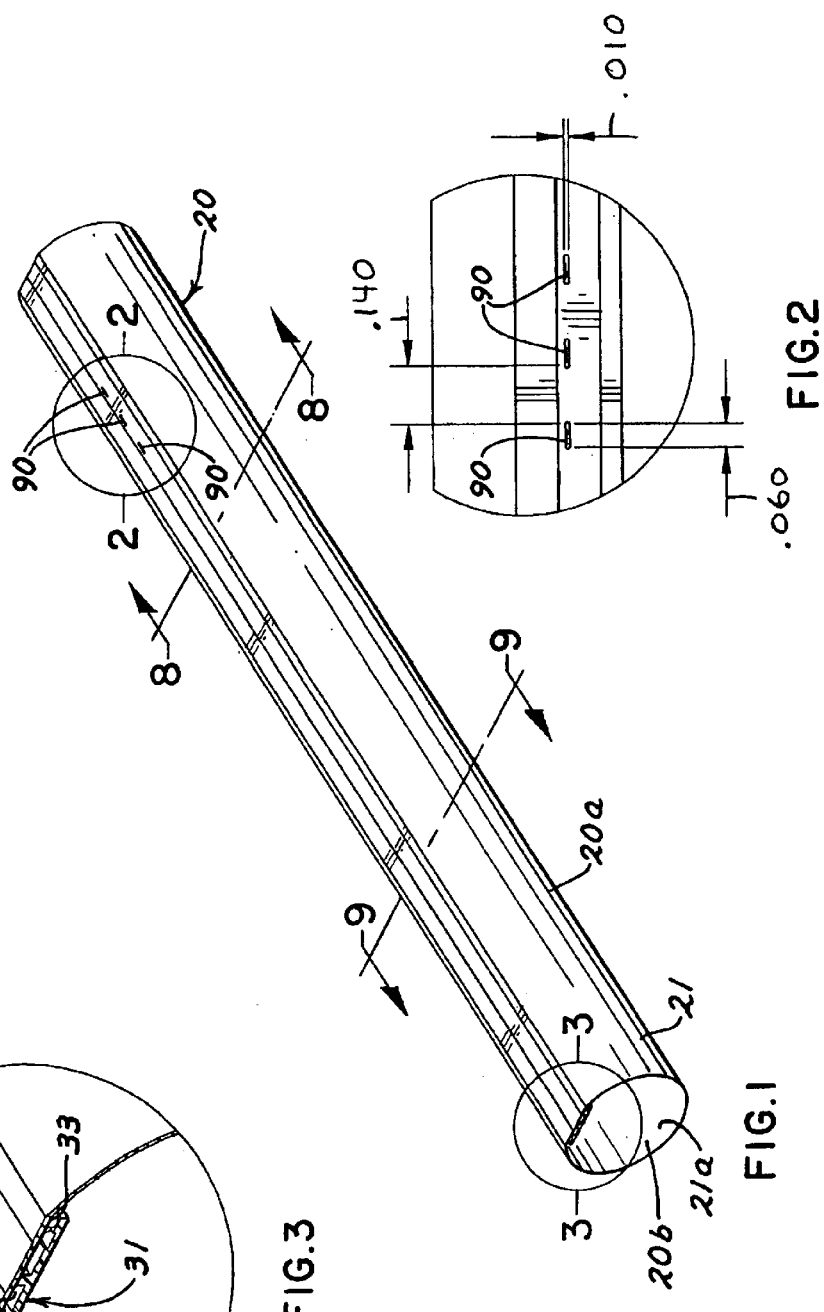

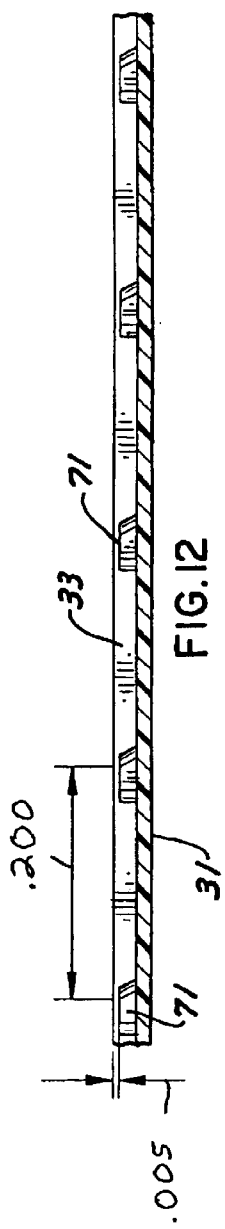
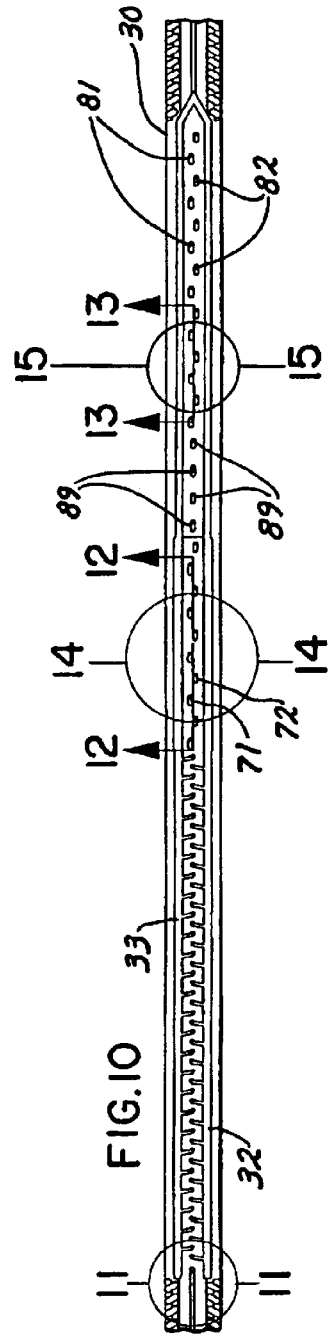
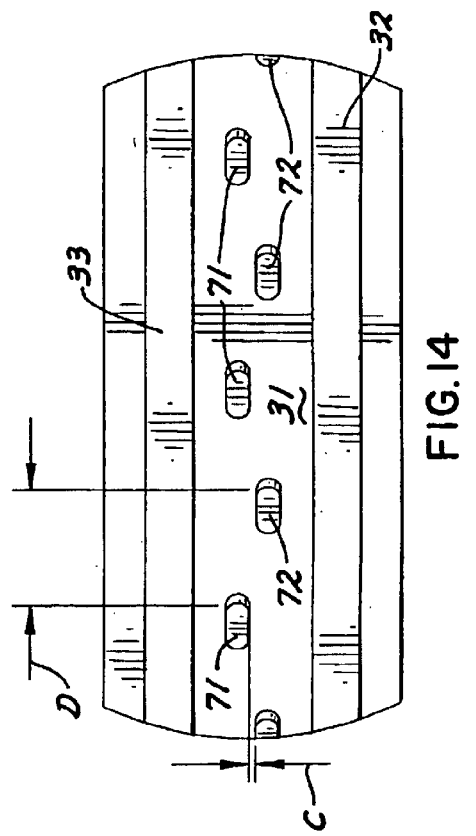
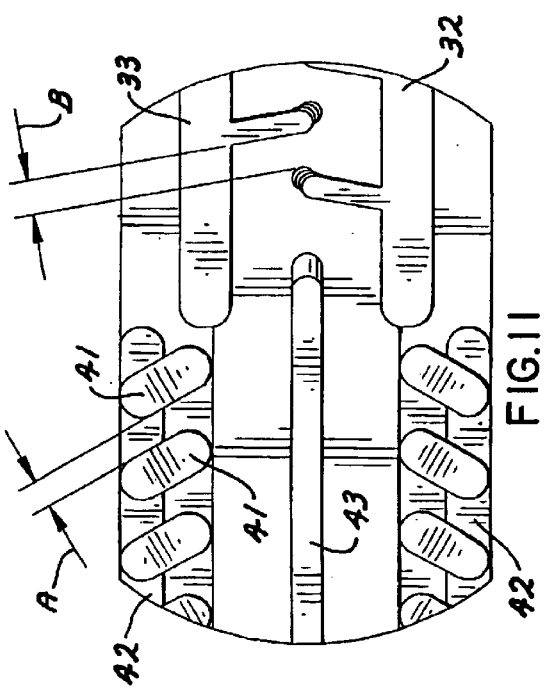

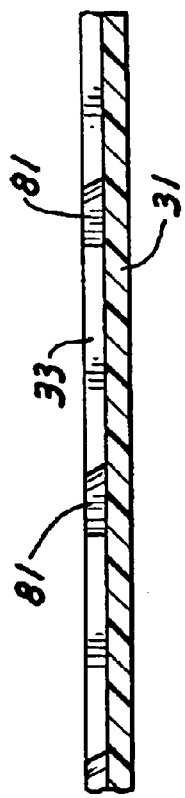
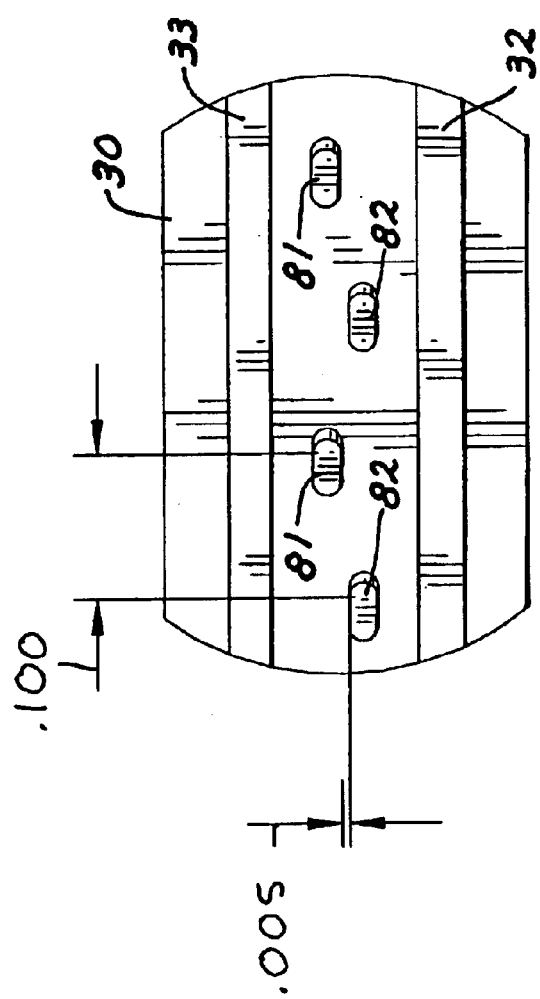

PRESSURE COMPENSATING DRIP IRRIGATION HOSE

BACKGROUND OF THE INVENTION

1. Field of the Invention

This invention relates generally to a pressure compensating irrigation hose, and more particularly to a pressure compensating hose having an elongate elastomeric member, which, with the hose, forms an irrigation hose having a plurality of pressure compensated emitters.

2. Description of the Prior Art

Agricultural irrigation systems in use today are predominantly flood and sprinkler systems. These systems have numerous shortcomings, including inefficient use of water and fertilizers, high labor and energy costs, pollution of surface and ground waters, and poor uniformity of water application on steep or uneven terrain.

Drip irrigation systems are being developed and adopted to address the above-noted problems. There are two major types of drip irrigation systems currently in use. The first involves use of discrete emitters installed either internally (In-Line) or externally (On-Line) to the hose. These emitters have passageways through which the water must pass, thereby regulating the water flow rate through the emitter. Such emitters may be pressure-compensating or non-pressure-compensating.

Another type of drip irrigation system employs a hose having a continuous emitter such as the Aqua-TraXX® hose of The Toro Company. Such hose includes the use of a continuous non-elastic strip which, in conjunction with the hose, forms a plurality of emitters. Perforations are then formed in the outside surface of the hose into the outlet of the emitter. However, such hose is not pressure compensating, and is therefore not suitable for use on steep or non-uniform terrain.

U.S. Pat. Nos. 4,984,739 and 5,333,793 are examples of a hose having a continuous emitter and also include a pressure compensating system. The present invention provides for a pressure compensating drip emitter irrigation hose which utilizes a continuous elastomeric strip member having a hardness which is less than that of the hose.

SUMMARY OF THE INVENTION

In one embodiment, the invention is a pressure compensating drip irrigation hose for distributing water. The hose has an inner wall having an inner surface which defines a main water passageway. A continuous elastomeric strip member is operatively connected to the inner surface. The continuous elastomeric strip member and the inner surface define a plurality of emitter units. The continuous elastomeric strip member has a bottom wall operatively connected to first and second spaced elongated side members. The bottom wall, side members and inner surface define an emitter water passageway. Each emitter unit comprises an inlet, wherein water from a main water passageway enters the emitter unit through the inlet. A pressure reducing section is downstream from the inlet, wherein water flowing through the emitter is slowed and water pressure is reduced. A pressure responsive section is downstream from the pressure reducing section, wherein with increased pressure in the main water passage, the bottom wall deflects towards the inner surface, thereby decreasing the size of the emitter water passageway. An outlet is formed in the hose wall, the outlet is in fluid communication with the emitter water passageway and downstream from the pressure responsive section.

In another embodiment, the invention is a pressure compensating drip irrigation hose for distributing water. The hose has a wall having an inner surface, the inner surface defining a main water passageway. A continuous elastomeric strip member has a hardness less than that of the hose, the continuous elastomeric strip member is operatively connected to the inner surface and defines an emitter water passageway. Each emitter unit comprises a water inlet, wherein water from the main water passageway enters the emitter through the inlet. A pressure reducing section is provided, wherein water flowing through the emitter is slowed and water pressure is reduced. In a pressure responsive section, the emitter also includes a pressure responsive section, wherein with increased pressure in the main water passageway, the bottom wall deflects towards the inner surface, thereby decreasing the size of the emitter water passageway. An outlet is formed on the hose wall, the outlet is in fluid communication with the emitter water passageway and a plurality of first preformed members are formed in the outlet section, whereby the pressure responsive section is more sensitive to pressure than the outlet section. In addition, a plurality of second preformed members are formed in the pressure reducing section, whereby the pressure reducing section is less responsive to pressure than the pressure responsive section.

BRIEF DESCRIPTION OF THE DRAWINGS

FIG. 1 is a perspective view of the irrigation hose of the present invention;

FIG. 2 is a top plan view of the outlet portion of the hose shown in FIG. 1 taken of the area generally defined by lines 2—2;

FIG. 3 is an enlarged perspective view of a portion of the hose shown in FIG. 1 taken generally defined by lines 3—3;

FIG. 10 is a top plan view of the continuous elastomeric strip member shown in FIG. 4;

FIG. 11 is an enlarged top plan view of a portion of the continuous elastomeric strip member shown in FIG. 10, taken generally defined by lines 11—11;

FIG. 12 is a cross-sectional view taken generally along the lines 12—12;

FIG. 13 is a cross-sectional view taken generally along the lines 13—13;

FIG. 14 is an enlarged top plan view of a portion of the continuous elastomeric strip member shown in FIG. 10, taken generally defined by lines 14—14; and FIG. 15 is an enlarged top plan view of a portion of the continuous elastomeric strip member shown in FIG. 10, taken generally defined by lines 15—15.

DETAILED DESCRIPTION OF THE PREFERRED EMBODIMENT

Figure 4:
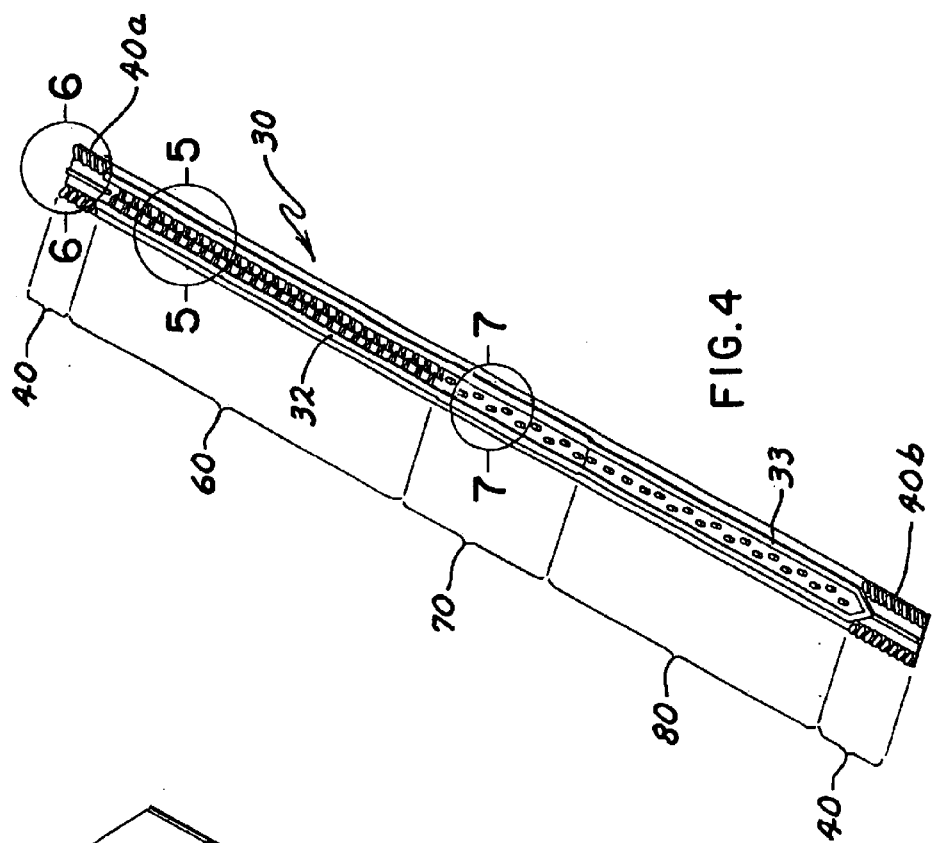
FIG. 4 is a perspective view of only the continuous elastomeric strip member shown in FIG. 1.
Figure 5:
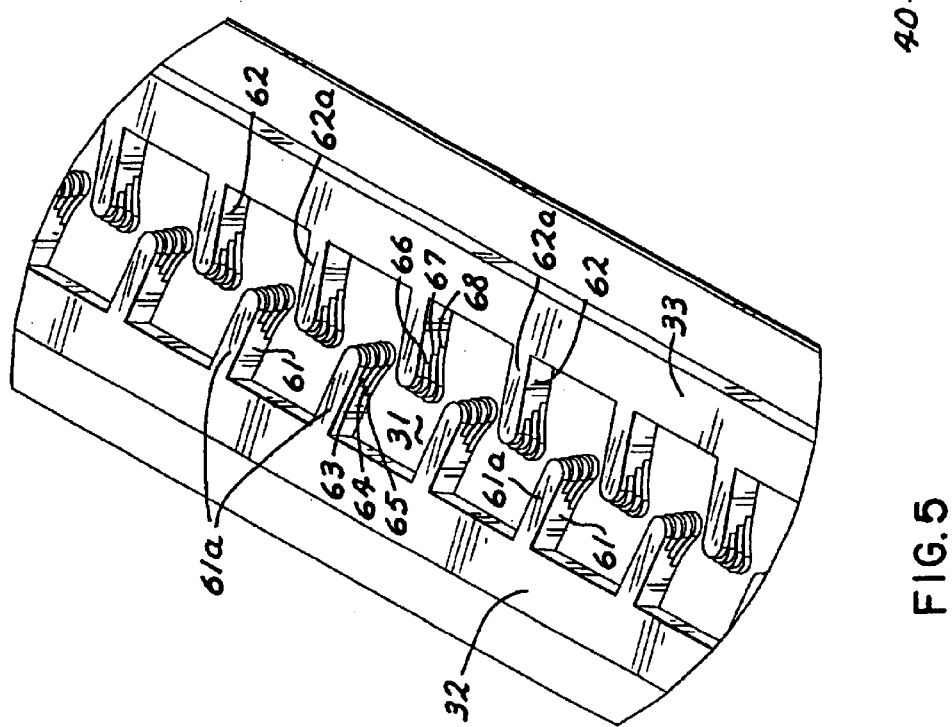
FIG. 5 is an enlarged perspective of a portion of the continuous elastomeric strip member shown in FIG. 4, taken generally defined by lines 5—5.
Figure 9:
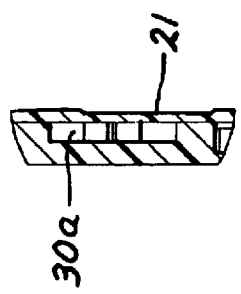
FIG. 9 is a partial cross-sectional view taken generally along the lines 9—9 of the hose shown in FIG. 1.
Figure 7:
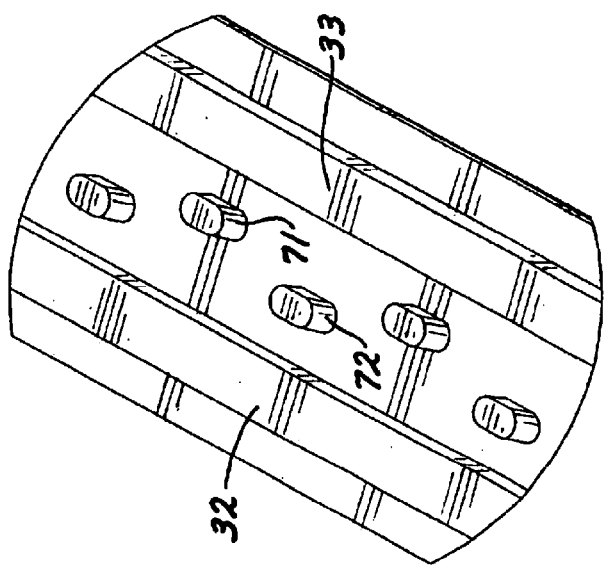
FIG. 7 is an enlarged perspective view of a portion of the continuous elastomeric strip member shown in FIG. 4, taken generally defined by lines 7—7.

Referring to the drawings, wherein like numerals represent like parts throughout the several views, there is generally disclosed at 20 a pressure compensating irrigation hose. The hose 20 includes a wall 21 that has an inner surface 21a. A continuous elastomeric strip member 30 is secured to the inner surface 21a. Preferably, the continuous elastomeric strip member 30 is an extruded elongate member and is manufactured prior to the manufacturing of the hose 20. The hose 20 is then extruded, by means well known in the art, around the continuous elastomeric strip member 30 so as to secure the continuous elastomeric strip member 30 to the inner surface 21 a of the wall 21. The wall 21 is extruded from any suitable material such as polyethylene. Further, the hose 20 may have any suitable diameter such as from 10 millimeters to 35 millimeters. The continuous elastomeric strip member 30 is extruded from an elastomeric material such as thermoplastic elastomer. The continuous elastomeric strip member 30 is softer than the wall 21. By way of example, the wall 21 may have a hardness of from 45 to 65 on the Shore D scale whereas the continuous elastomeric strip member 30 may have a hardness of from 40 to 70 on the Shore A scale.

The continuous elastomeric strip member 30 is a continuous extrusion of a plurality of emitter segments which, in combination with the wall 21, form a plurality of emitter units. One emitter segment of the continuous elastomeric strip member 30 is shown in FIGS. 4 and 10. The continuous elastomeric strip member 30 includes an inlet section 40, a pressure reducing section 60, a pressure responsive section 70 and an outlet section 80. The inlet section 40 is one continuous segment, but as shown in the drawings, includes a first segment 40b and a second segment 40a. While FIG. 4 represents one complete emitter segment, 40a is a portion of one emitter segment and 40b is a portion of a second emitter segment. For clarity and to show the continuing nature of the continuous elastomeric strip member 30, the inlet section 40 has been broken into two components, it being understood that a full inlet section would include both section 40a and 40b.

Figure 6:
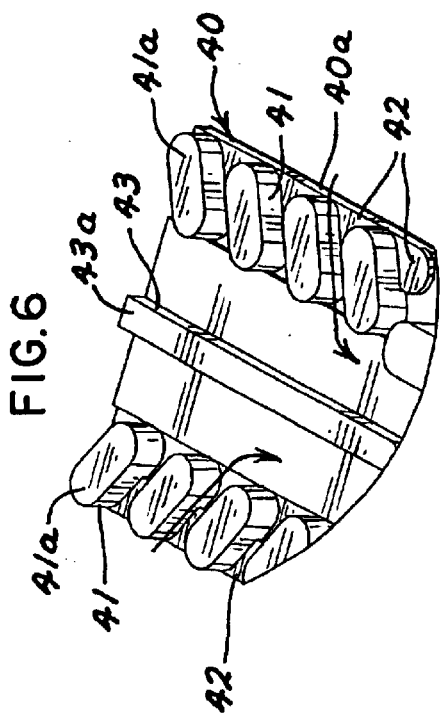
FIG. 6 is an enlarged perspective of a portion of the continuous elastomeric strip member shown in FIG. 4, taken generally defined by lines 6—6.
Figure 8:
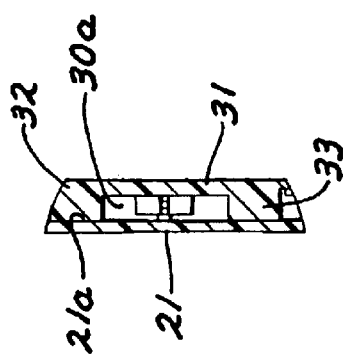
FIG. 8 is a cross-sectional area of the hose shown in FIG. 1 taken generally along the lines 8—8.

The continuous elastomeric strip member 30 has a bottom wall 31, a first side wall 32 and a second side wall 33. The side walls 32 and 33 are operatively connected to the bottom wall 31 and are preferably extruded with the bottom wall 31. The height of the walls 32 and 33 are preferably the same. Referring now to FIGS. 1, 6 and 11, it can be seen that the rails 32, 33 do not extend in the inlet section 40. A plurality of spaced oval shaped inlet members 41 are operatively connected to the bottom wall 31. The top surface 41a is at the same height as the top of the rails 32, 33. Therefore, when the wall 21 is extruded and the continuous elastomeric strip member 30 is welded to the inner surface 21a, the top of the side walls 32, 33 and the top surface 41a contact the inner surface 21a and, along with the bottom wall 31, form the emitter unit 20a. The irrigation hose 20 includes a plurality of emitter units 20a. The hose 20 is a continuous extrusion and therefore may be cut and packaged in any length.

A reinforcement member 42 is positioned adjacent the outer portions of the oval 41. The main water passageway 20b provides a flow of water through the irrigation hose 20. Water will enter from the main water passageway 20b between the oval inlet members 41 and into the emitter and the emitter water passageway 30a. A second reinforcing member 43 extends through the inlet section 40. The reinforcing member 43 has its top surface 43a at the same height as the top of the side walls 32, 33 and is therefore welded/bonded to the inner surface 21a.

Downstream from the inlet section 40 is the pressure reducing section 60. In the pressure reducing section 60 a plurality of spaced preformed members 61 are operatively connected to the bottom wall 31 and side wall 32 and extend generally inward from the side wall 32. Similarly, a plurality of spaced preformed members 62 are operatively connected to the bottom wall 31 and second side wall 33. The preformed members 61, 62 have an impact on the flow rate and the performance of the emitter 20a. The preformed members 61, 62 have sharp features so as to create the most turbulence in the flow of the water. This turbulence is required for the emitter to control the flow rate at lower pressures, before the pressure responsive section 70 begins to take control. The preformed shapes cause the flow of water to be disrupted in such a way as to cause the water to reverse directions and cause turbulence. These turbulences cause the water to slow and loose energy in the form of pressure. The top surface 61a, 62a is at the same height as the top surface of the side walls 32, 33. Therefore, the top surface 61a, 62a is bonded to the inner surface 21a of the wall 21. It is important that there be very little variation from emitter to emitter so that the amount of water that exits each emitter is the same. By having the preformed shapes 61, 62 bond to the inner surface 21a, the amount of variation from emitter to emitter is reduced. The preformed members 61, 62 are generally elongate and have a length which is sufficient to extend more than one half of the distance between the side walls 32, 33. Therefore, there is not a straight passageway for the water to flow. Instead, it must take a tortuous path around the preformed members 61, 62 as the water goes downstream in the emitter. Further, the preformed members 61, 62 have sharp features so as to create the most turbulence in the flow of water. This turbulence is required for the emitter to control the flow rate at the lower pressures, before the pressure responsive section 70 begins to take control. The preformed members 61, 62 have a generally rectangular shape that extends into the emitter water passageway. In addition, there are three steps 63–65 that are formed in the preformed 61 and three steps 66–68 that are formed in the preformed 62. The steps have a planar section that is generally perpendicular to the edge, thereby creating a plurality of sharp surfaces to cause water turbulence.

Referring now to FIG. 11, it can be seen that there is a distance A between the inlet members 41 of approximately 0.19 inches. There is a distance B between the preformed members 61, 62 of 0.024 inches. The distance A is less than the distance B. Therefore, the inlet members 41 act as a filter in that the distance between the inlet members 41 is less than any distances between other portions of the continuous elastomeric strip member 30 along the emitter passageway. Therefore, any particles that would pass through the inlets 41 should be able to pass through the emitter water passageway as the remaining openings are greater than the distance A.

Moving down from the pressure reducing section 60 is the pressure responsive section 70. The bottom wall 31 of the pressure responsive section 70 has a regulated thickness that is less than the bottom wall thickness in the rest of the emitter segment. This construction gives the pressure responsive section the ability to change shape in response to the pressure changes inside of the main water passageway 20b. The pressure responsive section 70 has two offset rows of preformed shapes. The first row has a plurality of preformed shapes 71. A second row of preformed shapes 72 are in axial alignment with each other. The preformed shapes 71, 72 are offset by a distance C which is approximately 0.005 inches. The horizontal distance between the preformed shapes 71, 72 is distance D, approximately 0.100 inches. The preformed shapes 71, 72 are operatively connected to the bottom wall 31. In FIG. 12, the preformed shapes 71 have a height which is less than the side wall 33. Similarly, the preformed shape 72 have a height which is less than the side wall 32. Since the preformed shapes 71, 72 are less than the side walls 32, 33, the preformed shapes will not be bonded to the inner surface 21a. The pressure responsive section 70 is constructed in such a way to have the ability to change shape in response to the pressure changes inside the main water passageway 30b. The preformed shapes 71, 72 act to maintain a minimum distance between the bottom wall 31 of the emitter and the inside wall surface 21a. As the pressure inside of the main water passageway 30b increases, the bottom wall 31 reflects towards the inside surface 21a. The preformed members 71, 72 will maintain a distance between the bottom wall 31 and the inner surface 21a. As the pressure in the main water passageway 30b decreases, the bottom wall 31 of the emitter returns to its original distance from the inside surface 21a. The preformed shapes 71, 72 are approximately 0.020 inches wide and 0.030 inches long and 0.015 high. The preformed shapes 71 are 0.025 inches from the side wall 33 and the preformed shapes 72 are 0.025 inches from the side wall 32. Since this section 70 is designed to deflect under pressure, there is a tendency to capture small particles of debris as they make their way through the emitter. If enough debris accumulates to block the flow of water, pressure equilibrium will occur. Since the features in this section 70 are not attached to the inner surface 21a, the bottom wall 31 will return to its original position. As the bottom wall 31 begins to move away from the inside surface 21a, the size of the water passage will increase, and the debris will be flushed away. The preformed shapes 71, 72 have a height that is approximately 80 percent of the height of the side walls 32, 33, although is has been found that it is preferable that the preformed 71, 72 have a height of approximately 80 percent of the height of the side walls 32, 33, between 75 and 85 percent is also acceptable and between 50 percent and 90 percent will provide for a working emitter. The spacing of 0.100 inches between the preforms has been found to be preferable. A distance of 0.125 inches also works acceptably, whereas a distance of 0.150 begins to show problems. The overall length of the pressure responsive section 70 is approximately 0.75 inches.

Downstream from the pressure responsive section 70 is an outlet section 80. The outlet section 80 includes two offset rows of preformed shapes 81, 82. The first row of a line of preformed members 81 is offset by approximately 0.005 inches from the second row of aligned preformed members 82. The sizing, spacing and alignment of the preformed members 81a, $\mu$are the same as the preformed members 71, 72 except the preformed members 81, 82 are formed as the same height as the side walls 32, 33. Therefore, the tops of the preformed members 81, 82 are bonded to the inner surface 21a. The preformed members 81, 82 maintain a constant distance between the bottom wall 31 and the inner surface 21a. This constant distance allows for the flow rate of the emitter to not be affected in the outlet section 80. The water exits the emitter water passageway through a plurality of outlet orifices 90 that are formed in the tube 21. Four visual markers 89 preceed the preform members 81, 82 and are used in production to visually indicate the outlet section 80. The outlet orifices 90 are axially spaced from each other. Having multiple outlet orifices allow for the velocity of the water moving through the emitter to be evenly divided and decreased. As the water exits each of the orifices 90, the water is moving at a slower velocity and will tend to fall straight down from the tube instead of continuing down the outside of the tube. Exactly where the water drips from the irrigation hose 20 is important and therefore it is important to know how the water will exit the orifices 90. The multiple orifices 90 allow the water to drip from the tube and not run on the tube. The orifices 90 are approximately 0.060 inches in length and 0.010 inches in width. The spacing between the orifices 90 is approximately 0.140 inches. It has been found preferable to have the spacing between the orifices 90 to be at least 150 percent of the length of the orifices. Preferably, the spacing is at least 200 percent and as described above, the spacing is 233 percent. An additional advantage of having multiple orifices rather than a single orifice is that the orifices may be smaller and therefore less likely to ingest soil at the outlet as compared to if a single larger orifice was used.

Downstream, as used in this application, refers to the flow of water. As shown, the present invention has the sections not only downstream, but also longitudinal displaced downstream from the prior sections.

Also, because the continuous elastomeric strip member 30 is a very soft material, if the orifices 90 were too large, the flexible continuous elastomeric strip member 30 may be pushed through the orifices 90. By designing a series of smaller orifices 90, there may be higher pressures within the tube. Further, it is important to design the orifices 90 to have the cross-sectional areas of the openings larger than the cross-sectional area of the openings in the inlet section 40 if smaller, the flow of the water will be restricted and it would spray out of the orifices 90, rather than drip.

The use of a soft elastomeric material for the continuous elastomeric strip member 30 is required for this hose to function as a pressure responsive hose. The hardness of the material is therefore a critical ingredient. Hardness is roughly equivalent to resistance to pressure. A very hard material will be very resistant to pressure and not bend in response to pressure. Since the present invention is for a pressure compensating hose, a softer material is required. It has been found that a material such as thermoplastic elastomer having a hardness of from 40–70 on the Shore A scale is preferable. However, it is recognized that the resistance to pressure is determined not only by the hardness of the material but also by the thickness of material and the shape and positioning of the preforms. If the preforms are positioned close together, they give added support to the bottom wall 31. The extra support would keep the bottom wall 31 from deflecting as easily under pressure. Similarly, if the preforms were positioned too far apart, the flexible bottom wall 31 would deflect all the way to the inner surface 21a. The thickness of the material can also be used to fine tune the ranges of pressure that the hose will function within. The thicker the cross section of elastomeric material the less susceptible the material is to a condition known as compression set. Compression set is a mechanical property of elastomers. When compression set takes place, a material that has been subject to pressure in temperature over time is unable to return to its original shape when pressure is removed. What this means in an irrigation product is that the flow rate of an emitter will decrease and the pressure responsiveness will be adversely affected if there is compression set. Therefore, there is an advantage to using a softer material and a thicker cross section. There is also the balancing of the known fact that the softer the material, the harder it is to process for manufacturing purposes. It has been found that the present arrangement as described with a material of from 40–70 on the Shore A scale and preferably from 55–65 on the Shore A scale for the continuous elastomeric strip member 30 and a hose of a harder material such as a polyethylene with a hardness of 45–60 on the Shore D scale provides for an effective emitter at water pressure ranges typically used in irrigation systems.

The continuous elastomeric strip member 30 is made from a suitable elastomeric material such as a thermoplastic vulcanizate. The material consists of using highly cross-linked rubber particles dispersed throughout a continuous matrix of thermoplastic material. Such a thermoplastic vulcanizate is preferred, but other suitable elastomeric materials may also be utilized.

The thickness of the continuous elastomeric strip member 30 varies in different sections of the emitter. The thickness of the bottom wall 31 has a first thickness in the pressure responsive section 70 that is less than the thickness in the inlet section 40, pressure reducing sections 60 and outlet section 80. The thickness in the pressure reducing section 60 is approximately 0.008 inches and the thickness in the outlet section 80 is approximately 0.015 inches. The pressure responsive section is therefore more flexible and can deflect more with various pressures in the hose. The smaller thicknesses also used in the inlet section 40 and the pressure reducing section 60. However, in the inlet section 40, the oval members 41 and the reinforcement member 42 are operatively connected to both the inner surface 21a and the bottom wall 31 thereby adding additional structural integrity to the inlet section 40. Further, in the pressure reducing section 60, the preform members 61 are similarly operatively connected to both the inner surface 21a and bottom wall 31, thereby also giving further structural integrity to the pressure reducing section 60. As previously discussed, it can therefore be seen that there is an innerplay between the thickness of the bottom wall 31 and the size, shape and location of the preforms which can effect the emitters responsiveness to pressure. It has been found that the thickness of approximately 0.008 inches provides a good balance between the cost of materials and performance of the emitter. The thickness in the pressure responsive section 60 could be designed to be thicker than the 0.008 inches with changing the other variables noted above. It has been found that to go much below a 0.005 inches in thickness for the thermoplastic vulcanizate material makes production difficult and therefore it has been found to be advantageous to keep the thickness of at least about 0.005 inches and preferably about 0.008 inches in the pressure responsive section 70.

The emitter segments have a length of approximately 4–12 inches and 6 inches as shown. Therefore, there is an emitter unit every 4–12 inches along the hose 20. However, if outlet orifices 90 are not formed in the hose wall 21, there would be no emitter. Therefore, by simply skipping the orifices, the spacing of the emitter units along the hose 20 may be changed.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A pressure compensating drip irrigation hose for distributing water comprising:

a) a hose having a wall with an inner surface, the inner surface defining a main water passage;

b) a continuous elastomeric strip member operatively connected to the inner surface, the continuous elastomeric strip member and the inner surface defining a plurality of emitter units, the continuous elastomeric strip member having a bottom wall operatively connected to first and second spaced elongated side members, the bottom wall, sides and inner surface defining an emitter water passageway;

c) each emitter unit comprising:

i) an inlet wherein water from the main water passageway enters the emitter unit through the inlet;

ii) a pressure reducing section downstream from the inlet, wherein water flowing through the emitter is slowed and water pressure is reduced, the pressure reducing section having a plurality of second preformed members, the second preformed members operatively connected to both the bottom, wall and the inner surface, thereby making the pressure reducing section more resistant to deflection; and iii) a pressure responsive section downstream from the pressure reducing section, wherein with increased pressure in the main water passage) the bottom wail deflects toward the inner surface, thereby decreasing a size of the emitter water passageway; and d) an outlet formed in the hose wall, the outlet in fluid communication with the emitter water passageway and downstream from the pressure responsive section.

2. The hose of claim 1, each emitter unit thither comprising an outlet section downstream from the pressure reducing section, a plurality of first preformed members operatively connected to the bottom wall to maintain a constant distance between the bottom wall and the inner surface, the outlet formed over the outlet section.

3. The hose of claim 2, wherein the outlet comprises a plurality of orifices, the orifices spaced longitudinally along the hose.

4. The hose of claim 2 wherein the bottom wall has a first thickness for the pressure responsive section and a second thickness for outlet section, the first thickness less than the second thickness.

5. The hose of claim 4, wherein the first thickness is at least about 0.005 inches and the elastomeric member is constructed from a thermoplastic vulcanizate material.

6. The hose of claim 5, wherein the first thickness is at least about 0.008 inches.

7. The hose of claim 1, wherein the inlet having openings with a cross-sectional flow path sized smaller than a cross-section of the emitter water passageway, wherein the openings act as a filter.

8. The hose of claim 1, wherein the second preformed members having a stepped profile, whereby more turbulence is created.

9. The hose of claim 1, the inlet further comprising a plurality of spaced members operatively connected to the bottom wall and the inner surface, thereby acting both as openings for the inlet and a stiffening member of the inlet to make die inlet more resistant to deflection.

10. The hose of claim 9, the inlet further comprising a longitudinal reinforcement member operatively connected to both the bottom wall and the inner surface, thereby making the inlet more resistant to deflection.

11. The hose of claim 1, wherein the second preforms having a stepped profile, whereby more turbulence is created.

12. A pressure compensating drip irrigation hose for distributing water comprising:

a) a hose having a wall with an inner surface, the inner surface defining a main water passage;

b) a continuous elastomeric strip member having a bottom wall, the continuous strip member having a hardness less than that of the hose, the continuous elastomeric strip member operatively connected to the inner surface, defining an emitter water passageway;

c) each emitter unit comprising:
  i) an inlet, wherein water from the main water passageway enters the emitter unit through the inlet;
  ii) a pressure reducing section, wherein water flowing through the emitter is slowed and water pressure is reduced, the pressure reducing section having a plurality of second preformed members, the second preformed members operatively connected to both the bottom wall and the inner surface, thereby making the pressure reducing section more resistant to deflection;
  iii) a pressure responsive section, wherein with increased pressure in the main water passage, the bottom wall deflects toward the inner surface, thereby decreasing a size of the emitter water passageway whereby the pressure reducing section is less responsive to pressure than the pressure responsive section; and
  iv) an outlet section downstream from the pressure responsive section, a plurality of first preformed members formed in the outlet section, whereby the pressure responsive sections more sensitive to pressure than the outlet section;

d) an outlet formed in the hose wall, the outlet in fluid communication with the emitter water passageway.

13. The hose of claim 12, wherein the plurality of first preformed members operatively connected to the bottom wall to maintain a constant distance between the bottom wall and the inner surface, the outlet formed over the outlet section.

14. The hose of claim 13, wherein the outlet comprises a plurality of orifices, the orifices spaced longitudinally along the hose.

15. The hose of claim 12, wherein the inlet having openings with a cross-sectional flow path sized smaller than a cross-section of the emitter water passageway, wherein the openings act as a filter.

16. The hose of claim 12, the inlet further comprising a plurality of spaced members operatively connected to the bottom wall and the inner surface, thereby acting both as openings for the inlet and a stiffening member of the inlet to make the inlet more resistant to deflection.

17. The hose of claim 16, the inlet further comprising a longitudinal reinforcement member operatively connected to both the bottom wall and the inner surface, thereby making the inlet more resistant to deflection.

18. The hose of claim 12, wherein the second preforms having a stepped profile, whereby more turbulence is created.

19. The hose of claim 12, wherein the bottom wall has a first thickness for the pressure responsive section and a second thickness for outlet section, the first thickness less than the second thickness.

20. The hose of claim 19, wherein the first thickness is at least about 0.008 inches and the elastomeric member is constructed from a thermoplastic vulcanizate material.

21. The hose of claim 19, wherein the first thickness is at least about 0.008 inches.

22. A pressure compensating drip irrigation hose for distributing water comprising:
  a) a hose having a wall with an inner surface, the inner surface defining a main water passage;
  b) a continuous elastomeric strip member operatively connected to the inner surface, the continuous elastomeric strip member and the inner surface defining a plurality of emitter units, the continuous elastomeric strip member having a bottom wall operatively connected to first and second spaced elongated side members, the bottom wall, sides and inner surface defining an emitter water passageway;
  c) each emitter unit comprising:
    i) an inlet, wherein water from the main water passageway enters the emitter unit through the inlet, the inlet further comprising a plurality of spaced members operatively connected to the bottom wall and the inner surface, thereby acting both as openings for the inlet end a stiffening member of the inlet to make the inlet more resistant to deflection;
    ii) a pressure reducing section downstream from the inlet, wherein water flowing through the emitter is slowed and water pressure is reduced; and
    iii) a pressure responsive section downstream from the pressure reducing section, wherein with increased pressure in the main water passage, the bottom wall deflects toward the inner surface, thereby decreasing a size of the emitter water passageway; and
  d) an outlet formed in the hose wall, the outlet in fluid communication with the emitter water passageway and downstream from the pressure responsive section.

23. A pressure compensating drip irrigation hose for distributing water comprising:
  a) a hose having a wall with an inner surface, the inner surface defining a main water passage;
  b) a continuous elastomeric strip member operatively connected to the inner surface, the continuous elastomeric snip member and the inner surface defining a plurality of emitter units, the continuous elastomeric strip member having a bottom wall operatively connected to first and second spaced elongated side members, the bottom wall, sides and inner surface defining an emitter water passageway;
  c) each emitter unit comprising:
    i) an inlet, wherein water from the main water passageway enters the emitter unit through the inlet;
    ii) a pressure reducing section downstream from the inlet, wherein water flowing through the emitter is slowed and water pressure is reduced; end
    iii) a pressure responsive section downstream from the pressure reducing section, wherein with increased pressure in the main water passage, the bottom wall deflects toward the inner surface, thereby decreasing a size of the emitter water passageway;
  d) wherein the bottom wall has a first thickness for the pressure responsive section and a second thickness for outlet section, the first thickness less than the second thickness; and
  e) an outlet formed in the hose wall, the outlet in fluid communication with the emitter water passageway and downstream from the pressure responsive section.

24. A pressure compensating drip irrigation hose for distributing water comprising:
  a) a hose having a wall with an inner surface, the inner surface defining a main water passage;
  b) a continuous elastomeric strip member having a bottom member, the continuous strip member having a hardness less than that of the base, the continuous elastomeric strip member operatively connected to the inner surface, defining an emitter water passageway;

c) each emitter unit comprising:
  i) an inlet, wherein water from the main water passageway enters the emitter unit trough the inlet the inlet further comprising a plurality of spaced members operatively connected to the bottom wall and the inner surface, thereby acting hot as openings for the inlet and a stiffening member of the inlet to make the inlet more resistant to deflection;
  ii) a pressure reducing section, wherein water flowing through the emitter is slowed and water pressure is reduced; and
  iii) a pressure responsive section, wherein with increased pressure in the main water passage, the bottom wall deflects toward the inner surface, thereby decreasing a size of the emitter water passageway;
  iv) an outlet section downstream from the pressure responsive section, a plurality of first preformed members formed in the outlet section, whereby the pressure responsive section is more sensitive to pressure than the outlet section;
d) an outlet formed in the hose wall, the outlet in fluid communication with the emitter water passageway; and
e) a plurality of second preformed members formed in the pressure reducing section, whereby the pressure reducing section is less responsive to pressure than the pressure responsive section.

25. A pressure compensating drip irrigation hose for distributing water comprising:
  a) a hose having a wall with an inner surface, the inner surface defining a main water passage;
  b) a continuous elastomeric strip member having a bottom wall, the continuous strip member having a hardness less than that of the hose, the continuous elastomeric strip member operatively connected to the inner surface, defining an emitter water passageway;
  c) each emitter unit comprising:
    i) an inlet, wherein water from the main water passageway enters the emitter unit through the inlet;
    ii) a pressure reducing section, wherein water flowing through the emitter is slowed and water pressure is reduced; and
    iii) a pressure responsive section, wherein with increased pressure in the main water passage, the bottom wall deflects toward the inner surface, thereby decreasing a size of the emitter water passageway;
    iv) an outlet section downstream from the pressure responsive section, a plurality of first preformed members formed in the outlet section, whereby the pressure responsive section is more sensitive to pressure than the outlet section;
  d) an outlet formed in the hose wall, the outlet in fluid communication with the emitter water passageway;
  e) a plurality of second preformed members formed in the pressure reducing section, whereby the pressure reducing section is less responsive to pressure than the pressure responsive section; and
  f) the bottom wall has a first thickness for the pressure responsive section and a second thickness for outlet section, the first thickness less than the second thickness.

26. The hose of claim 25, wherein the bottom wall has a first thickness for the pressure responsive section and a second thickness for outlet section, the first thickness less than the second thickness.

27. A pressure compensating drip irrigation hose for distributing water comprising:
  a) a hose having a wall with an inner surface, the inner surface defining a main water passage;
  b) a continuous elastomeric strip member operatively connected to the inner surface, the continuous elastomeric strip member and the inner surface defining a plurality of emitter units, the continuous elastomeric strip member having a bottom wall operatively connected to first and second spaced elongated side members, the bottom wall, sides and inner surface defining an emitter water passageway;
  c) each emitter unit comprising:
    i) an inlet, wherein water from the main water passageway enters the emitter unit through the inlet;
    ii) the pressure reducing section downstream from the inlet, wherein water flowing through the emitter is slowed and water pressure is reduced;
    iii) a pressure responsive section downstream from the pressure reducing section, wherein with increased pressure in the main water passage, the bottom wall deflects toward the inner surface, thereby decreasing a size of the emitter water passageway; and
    iv) an outlet section downstream from the pressure reducing section, a plurality of first preformed members operatively connected to the bottom wall and having tops operatively connected to the inner surface to maintain a constant distance between the bottom wall and the inner surface;
  d) an outlet formed in the hose wall over the outlet section, the outlet having a plurality of orifices, the orifices spaced along the hose; and
  e) the orifices each have a length and are spaced at a distance that is at least 150 percent of the length of the orifice.

* * * * *

UNITED STATES PATENT AND TRADEMARK OFFICE
CERTIFICATE OF CORRECTION

PATENT NO. : 6,736,337 B2
DATED : May 18, 2004
INVENTOR(S) : Jeffrey A. Vildibill and William C. Taylor, Jr.

It is certified that error appears in the above-identified patent and that said Letters Patent is hereby corrected as shown below:

Column 3,
Line 15, delete "21 a" and insert therefore -- 21a --

Column 5,
Line 54, delete "$\mu$are" and insert therefore -- 82 are --

Column 8,
Line 10, insert -- , -- after "inlet"
Line 17, delete "," after "bottom"
Line 22, delete ")" after "passage" and insert therefore -- , -- and delete "wail" and insert therefore -- wall --
Line 28, delete "thither" and insert therefore -- further --
Line 57, delete "die" and insert therefore -- the --

Column 9,
Line 27, delete "sections" and insert therefore -- section is --

Column 10,
Line 15, delete "end" and insert therefore -- and --
Line 34, delete "snip" and therefore -- strip --
Line 45, delete "end" and insert therefore -- and --
Line 65, delete "base" and insert therefore -- hose --

Column 11,
Line 3, delete "trough" and insert therefore -- through --
Line 6, delete "hot" and insert therefore -- both --

Signed and Sealed this

Ninth Day of November, 2004

JON W. DUDAS
*Director of the United States Patent and Trademark Office*